UNITED STATES PATENT OFFICE.

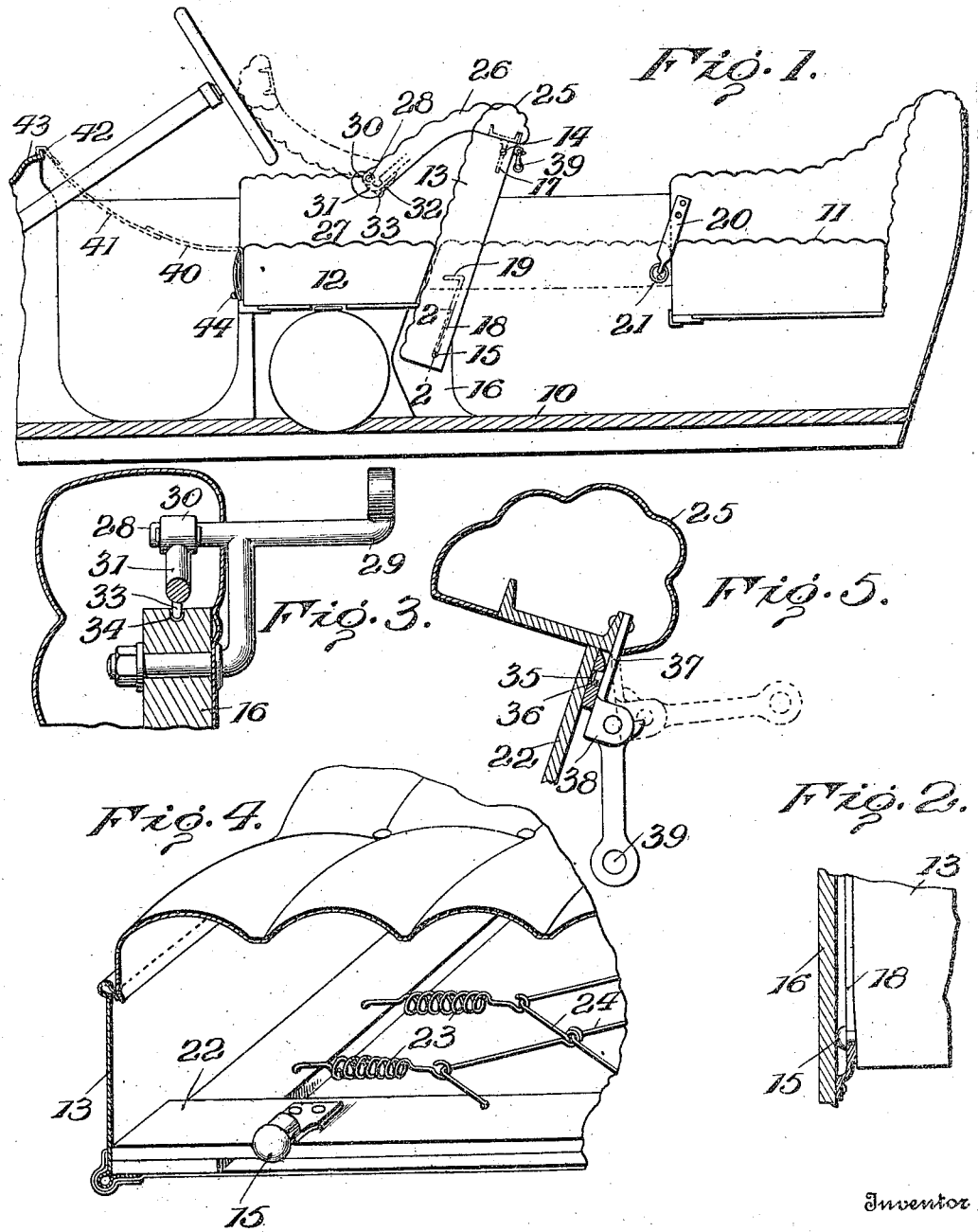

DAVID VAUGHN, OF WALLA WALLA, WASHINGTON.

VEHICLE-SEAT.

1,236,022.  Specification of Letters Patent.  Patented Aug. 7, 1917.

Original application filed November 8, 1915, Serial No. 60,264. Divided and this application filed July 7, 1916. Serial No. 108,028.

*To all whom it may concern:*

Be it known that I, DAVID VAUGHN, a citizen of the United States, residing at Walla Walla, in the county of Walla Walla and State of Washington, have invented certain new and useful Improvements in Vehicle-Seats, of which the following is a specification.

This invention relates to convertible vehicle seats, and more especially to seats of this type applied to automobiles.

The present application is a division of the one filed November 8, 1915, Serial No. 60264, and has reference to a latch device operating in conjunction with a robe rail.

In order that the invention may be better understood, reference is had to the accompanying drawings, in which—

Figure 1 is a side elevation, partly in section, of the body of an automobile showing the application of the invention;

Fig. 2 is an enlarged sectional detail on the line 2—2 of Fig. 1;

Fig. 3 is a detail of a hinge structure;

Fig. 4 is a detail illustrating a back rest structure, and

Fig. 5 is an elevation of a latch.

Referring specifically to the drawings, 10 denotes the floor of the car body, and 11 the usual movable cushion of the rear seat. The cushion of the front seat is indicated at 12, the same being also movably mounted on the seat base.

The back rest 13 of the front seat has headed studs or buttons 14 and 15 near its upper and lower ends, which slidably seat in slotted members made a part of the sides 16 of the car body. The top slot is shown at 17 and the bottom slot at 18. By means of these studs the back rest 13 is shiftably supported so that it may be lowered to serve as a part of a bed or bunk. The sliding connection between the back rest and the sides of the car body also permits the use of a longer back rest so that it may bridge the space between the front and rear seats when said seats are converted into a bed or bunk, as will be presently described, and the studs also act as a brace or support to hold the sides of the car body together. The studs are rigidly fastened to the back rest so that there will be a continuous support from one side of the car body to the other. The slots 17 and 18 have a slight taper on the inside and at the bottom, which, as the back rest seats itself, will make a tight joint and prevent rattling.

The slots 17 and 18 are vertical and parallel to the back rest 13, and the upper ends of the slots 18 have forwardly extending branches 19 to afford a support for the back rest when the same is lowered for the bed or bunk, and being at a point a little above the center, the studs 15 still brace the sides 16 of the car body.

To support the rear end of the back rest 13 when it is in lowered position, there is attached to each side 16 of the car body a strap 20 carrying a ring 21 into which the stud 14 hooks. When not in use, the straps and rings are placed between the rear seat cushion 11 and the side of the car body. The slot 17 has an enlarged upper open end so that the stud 14 can be slipped out preparatory to lowering the back rest 13.

As shown in Fig. 4, the back rest 13 is composed of a spring steel frame 22 which holds the springs 23 and wires 24, said frame being upholstered in the usual way, with a back of carpet or other material; also the usual helical springs may be employed. The construction of the cushion is immaterial, except that the studs 14 and 15 must be rigidly connected, the connection being made with the frame 22 as shown.

On the top edge of the back rest 13 is mounted a cushion 25 which is connected to or in one piece with cushions 26 at the rear and top of the side cushions 27 of the front seat. This cushion 25 with its forwardly extending end portions 26 is hinged so that it may be swung upward and forward when the back rest 13 is lowered, as shown dotted in Fig. 1, the following hinge connection being provided for this purpose: On the stub end 28 of the bracket or iron 29 which supports the front end of the car top is pivoted a hinge member composed of a sleeve 30 having a curved arm 31 which is made fast to the frame of the part 26 in any suitable manner as indicated at 32. Both parts 26 are provided with this hinge connection. The arm 31 makes a downward curve and has a bottom lug 33 which seats slidably in a recess 34 in the top of the side wall 16 of the car, and holds the parts firm and rigid.

When the cushion 25 is in place on top of the back rest 13 it is held by a latch comprising the following parts: One of the frame members 22 has a keeper aperture 35 for a latch pin 36 carried by a spring shank 37 made fast to the frame of the cushion 25. The shank 37 has an outstanding ear 38 to which is hinged a robe rail 39. A latch as herein described is located at each end of the cushion 25 and said latches support the robe rail in the manner stated. When it is desired to elevate the cushion 25, the robe rail is pulled up to flex the shank 37 as shown dotted in Fig. 5, which withdraws the pins 36 from the aperture 35 and releases the cushion, after which the latter may be swung forward, the robe rail affording a handle for this purpose.

When the seats of the car are to be used as a bed or bunk, the cushion 25 is unlatched and swung forward so that it rests on the steering wheel of the car, and the back rest 13 is then swung down to extend horizontally between the front and rear seat cushions 12 and 11 as shown dotted in Fig. 1, in which position the back rest is supported by the rings 21 as hereinbefore described. By swinging the cushion 25 forward as shown, there is had a free open space above the bunk.

There is also provided a canvas or cloth front 40 which is attached to or made a part of the front cushion 12 and has straps 41 provided with hooks 42 for attachment to the dash 43. When not in use, the front cloth and its straps are folded up and supported on the front of the seat cushion by buttons 44.

I claim:

The combination with the back rest of a vehicle seat having a top cushion pivotally supported to swing upward and forward, of a robe rail, and latches having spring shanks to which the robe rail is connected, said shanks being carried by the aforesaid cushion, and the latches being engageable with the back rest to lock the cushion thereto.

In testimony whereof I affix my signature in the presence of two witnesses.

DAVID VAUGHN.

Witnesses:
FRANK EMIGH,
D. W. BRUINS.

Copies of this patent may be obtained for five cents each, by addressing the "Commissioner of Patents, Washington, D. C."